US005854916A

United States Patent [19]
Nachenberg

[11] Patent Number: 5,854,916
[45] Date of Patent: Dec. 29, 1998

[54] STATE-BASED CACHE FOR ANTIVIRUS SOFTWARE

[75] Inventor: Carey S. Nachenberg, Northridge, Calif.

[73] Assignee: Symantec Corporation, Cupertino, Calif.

[21] Appl. No.: 757,935

[22] Filed: Nov. 27, 1996

Related U.S. Application Data

[63] Continuation-in-part of Ser. No. 684,580, Jul. 19, 1996, Pat. No. 5,765,030, Ser. No. 605,285, Feb. 9, 1996, and Ser. No. 535,340, Sep. 28, 1995, Pat. No. 5,696,822.

[51] Int. Cl.$^6$ ..................................................... G06F 9/455
[52] U.S. Cl. ............................................................ 395/500
[58] Field of Search ............................ 395/500, 183.14, 395/181; 364/578, 580, 550, 579; 380/4

[56] References Cited

U.S. PATENT DOCUMENTS

| | | | |
|---|---|---|---|
| 4,975,950 | 12/1990 | Lentz | 380/4 |
| 5,121,345 | 6/1992 | Lentz | 364/550 |
| 5,144,660 | 9/1992 | Rose | 380/4 |
| 5,319,776 | 6/1994 | Hile et al. | 395/575 |
| 5,321,840 | 6/1994 | Ahlin et al. | 395/700 |
| 5,349,655 | 9/1994 | Mann | 395/575 |
| 5,359,659 | 10/1994 | Rosenthal | 380/4 |
| 5,398,196 | 3/1995 | Chambers | 364/580 |
| 5,408,642 | 4/1995 | Mann | 395/575 |
| 5,421,006 | 5/1995 | Jablon et al. | 395/575 |
| 5,440,723 | 8/1995 | Arnold et al. | 395/181 |
| 5,442,699 | 8/1995 | Arnold et al. | 380/4 |
| 5,452,442 | 9/1995 | Kephart | 395/183.14 |
| 5,485,575 | 1/1996 | Chess et al. | 395/183.14 |

FOREIGN PATENT DOCUMENTS

| | | | |
|---|---|---|---|
| 0636977 A2 | 2/1995 | European Pat. Off. | G06F 11/00 |

OTHER PUBLICATIONS

Gotlieb, L., "End Users and Responsible Computing", *CMA—the Management Accounting Magazine*, vol. 67, No. 7, Sep. 1993, p. 13.

Karney, J., "Changing the Rules on Viruses", *PC Magazine*, vol. 13, No. 14, Aug. 1994, p. NE36.

Schnaidt, P., "Security", *LAN Magazine*, vol. 7, No. 3, Mar. 1992, p. 19.

"UK–Sophos Intros Unix Virus Detection Software 1/26/95", *Newsbytes News Network*, Jan. 26, 1995.

"Anti–virus Company Claims Polymorphic Breakthrough 7/10/92", *Newsbytes News Network*, Jul. 10, 1992.

"LAN Buyers Guide: Network Management", *LAN Magazine*, vol. 7, No. 8, Aug. 1992, p. 188.

Veldman, Frans, "Virus Writing Is High–Tech Infosecurity Warfare", *Security on the I–Way '95*, 1995, pp. L–1–L–16, U.S.A.

Symantec Corporation, "Norton AntiVirus for Windows 95 & Special Subscription Offer", 1995, U.S.A.

ThunderBYTE B.V., "User Manual", 1995, pp. i–191, Wijchen, The Netherlands.

"Virus Infection Techniques: Part 3", *Virus Bulletin*, 1995, pp. 006–007, Oxfordshire, England.

Cohen, Frederick B., "A Short Course on Computer Viruses—2d Ed.", *John Wiley & Sons, Inc.*, pp. 54–55, 199–209, 1994, U.S.A.

(List continued on next page.)

*Primary Examiner*—Kevin J. Teska
*Assistant Examiner*—Dan Fiul
*Attorney, Agent, or Firm*—Fenwick & West LLP

[57] ABSTRACT

A computer-implemented method for executing a computer file in a CPU emulator (154) to detect a computer virus. The method includes simulating (302) the execution of a predetermined number of instructions of the computer file in the CPU emulator (154), suspending (303) the execution, constructing (304) a state record, temporarily storing (305) the state record in memory, comparing (306) the constructed state record to state records stored in a state cache (158), and indicating (308) that the file is virus free when the constructed state record matches one of the stored state records.

5 Claims, 6 Drawing Sheets

OTHER PUBLICATIONS

Veldman, Frans, "Heuristic Anti–Virus Technology", *Proceedings of the International Virus Protection and Information Security Conference,* Apr. 1, 1994.

Wells, Joseph, "Viruses in the Wild", *Proceedings of the International Virus Protection and Information Society Conference*, Apr. 1, 1994.

Gordon, Scott, "Viruses & Netware", *Proceedings of the International Virus Protection and Information Security Conference*, Mar. 31, 1994.

Solomon, Alan, "Viruses & Polymorphism", *Proceedings of the International Virus Protection and Information Security Conference*, Mar. 31, 1994.

Case, Tori, "Viruses: An Executive Brief", *Proceedings of the International Virus Protection and Information Security Conference*, Mar. 31, 1994.

Skulason, Fridrik, "For Programmers", *Virus Bulletin*, Jul. 1990, pp. 10–11, Oxon, England.

Digitext, "Dr. Solomon's Anti–Virus Toolkit for Windows and DOS", *S&S International PLC*,Jan. 1995, pp. 1–15, 47–65, 75–77, 91–95, 113–115, and 123–142, United Kingdom.

"Automated Program Analysis for Computer Virus Detection", *IBM Technical Disclosure Bulletin*, vol. 34, No. 2, Jul. 1991, pp. 415–416.

"Artificial Immunity for Personal Computers", *IBM Technical Disclosure Bulletin*, vol. 34, No. 2, Jul. 1991, pp. 150–154.

Marshall, G., "Pest Control", *LAN Magazine*, Jun. 1995, pp. 55–67.

*A Model for Detecting the Existence of Software Corruption in Real Time*; Jeffrey M. Voas, Jeffery E. Payne, Frederick B. Cohen, 8246 Computers & Security 12 (1993) May, No. 3, Oxford, GB; XP 000383056; Elsevier Science Publishers Ltd.; pp. 275–283.

*A Cryptographic Checksum for Integrity Protection*; Fred Cohen, XP 000676891; North–Holland Computers & Security 6 (1987); pp. 505–510.

*A New Technique For Detecting Polymorphic Computer Viruses*; Carey Stover Nacehnberg; University of California, Los Angeles, 1995; pp. 1–132.

| Segment:Offset | Opcode Bytes | Mnemonic | |
|---|---|---|---|
| 1234:0100 | 06 | PUSH | ES |
| 1234:0101 | 17 | POP | SS |
| 1234:0102 | BE1B02 | MOV | SI,021B |
| 1234:0105 | BF1B01 | MOV | DI,011B |
| 1234:0108 | 8BCE | MOV | CX,SI |
| 1234:010A | F7D9 | NEG | CX |
| 1234:010C | FC | CLD | |
| 1234:010D | B81B01 | MOV | AX,011B |
| 1234:0110 | 06 | PUSH | ES |
| 1234:0111 | 50 | PUSH | AX |
| 1234:0112 | 06 | PUSH | ES |
| 1234:0113 | B81801 | MOV | AX,0118 |
| 1234:0116 | 50 | PUSH | AX |
| 1234:0117 | CB | RETF | |
| 1234:0118 | F3 | REPZ | |
| 1234:0119 | A4 | MOVSB | |
| 1234:011A | CB | RETF | |
| 1234:011B | E93221 | JMP | 2250 |
| 1234:011E | 70C9 | JO | 00E9 |

FIG. 4

```
CS:IP = 1234:010D
Bytes = B8 1B 01 06 50 06 B8 18
EAX=0000011B EBX=00000001  ECX=0000FDE5  EDX=00000000
ESP=00000000 EBP=00000000  ESI=0000021B  EDI=0000011B
FileSize = 00006AC6
NumMemoryWrites = 00000008 (PUSH ES, PUSH ES, PUSH AX, PUSH ES)
```

FIG. 5

| Segment:Offset | Opcode Bytes | Mnemonic | |
|---|---|---|---|
| 1234:00fd | E90030 | JMP | 3100 (Jump to virus) |
| 1234:0100 | 06 | PUSH | ES |
| 1234:0101 | 17 | POP | SS |
| 1234:0102 | BE1B02 | MOV | SI,021B |
| 1234:0105 | BF1B01 | MOV | DI,011B |
| 1234:0108 | 8BCE | MOV | CX,SI |
| 1234:010A | F7D9 | NEG | CX |
| 1234:010C | FC | CLD | |
| 1234:010D | B81B01 | MOV | AX,011B |
| 1234:0110 | 06 | PUSH | ES |
| 1234:0111 | 50 | PUSH | AX |
| 1234:0112 | 06 | PUSH | ES |
| 1234:0113 | B81801 | MOV | AX,0118 |
| 1234:0116 | 50 | PUSH | AX |
| 1234:0117 | CB | RETF | |
| 1234:0118 | F3 | REPZ | |
| 1234:0119 | A4 | MOVSB | |
| 1234:011A | CB | RETF | |
| 1234:011B | E93221 | JMP | 2250 |
| 1234:011E | 70C9 | JO | 00E9 |
| 1234:3100 | VIRUS BODY STARTS | | |
| . | | | |
| . | | | |
| . | | | |
| 1234:3200 | E9FDCE | JMP | 100 (Jump to host program) |

FIG. 6

STATE-BASED CACHE FOR ANTIVIRUS SOFTWARE

CROSS-REFERENCES TO RELATED APPLICATIONS

This patent application is a continuation-in-part of U.S. patent application Ser. No. 08/684,580, now U.S. Pat. No. 5,765,030 entitled "Cross CPU Pre-Fetch Queue" and filed on Jul. 19, 1996. This patent application is also a continuation-in-part of U.S. patent application Ser. No. 08/605,285, still pending entitled "Emulation Repair System" and filed on Feb. 9, 1996. This patent application is also a continuation-in-part of U.S. patent Application Serial No. 08/535,340, Pat. No. 5,696,822 entitled "Polymorphic Virus Detection Module" and filed on Sep. 28, 1995.

TECHINCAL FIELD

This invention pertains to the field of emulator-based antivirus software, in which a program file is scanned for the presence of computer viruses by executing it in a software-based CPU emulator.

BACKGROUND ART

Most simple computer viruses work by copying exact duplicates of themselves to each executable program file they infect. When an infected program executes, the virus gains control of the computer and attempts to infect other files. If it locates a target executable file for infection, it copies itself byte-for-byte to the target executable file. Because this type of virus replicates identical copies of itself each time it infects a new file, the virus can be easily detected by searching in files for a specific string of bytes (i.e. a "signature") that has been extracted from the virus.

Simple (non-polymorphic) encrypted viruses comprise a decryption routine (also known as a decryption loop) and an encrypted viral body. When a program file infected with a simple encrypting virus executes, the decryption routine gains control of the computer and decrypts the encrypted viral body. The decryption routine then transfers control to the decrypted viral body, which is capable of spreading the virus. The virus is spread by copying the identical decryption routine and the encrypted viral body to the target executable file. Although the viral body is encrypted and thus hidden from view, these viruses can be detected by searching for a signature from the unchanging decryption routine.

Polymorphic encrypted viruses ("polymorphic viruses") comprise a decryption routine and an encrypted viral body which includes a static viral body and a machine-code generator often referred to as a "mutation engine."Initially, the operation of a polymorphic virus is similar to the operation of a simple (nonpolymorphic) encrypted virus. When a program file infected with a polymorphic virus executes, the decryption routine gains control of the computer and decrypts the encrypted viral body. The decryption routine then transfers control of the computer to the decrypted viral body, which is capable of spreading the virus. However, the virus is spread by copying a newly generated decryption routine along with the encrypted viral body to the target executable file. The newly generated decryption routine is generated on the fly by the mutation engine. In many polymorphic viruses, the mutation engine generates decryption routines that are functionally the same for all infected files, but use different sequences of instructions to function. Common mutation strategies employed by the mutation engine include reordering of instructions, substituting equivalent instructions or equivalent sequences of instructions, and inserting instructions that have no effect on functionality. Because of these multifarious mutations, these viruses cannot be detected by simply searching for a signature from a decryption routine because each decryption routine may have a different signature.

In order to detect the growing number of polymorphic viruses, antivirus software companies are beginning to adopt emulator-based antivirus technology, also known as Generic Decryption (GD) technology. The GD scanner works in the following manner. Before executing a program suspected of being infected on the actual CPU (central processing unit) of the computer, the GD scanner loads the program into a software-based CPU emulator which acts as a simulated virtual computer. The program is allowed to execute freely within this virtual computer. If the program does in fact contain a polymorphic encrypted virus, the decryption routine is allowed to decrypt the viral body. The GD scanner can then detect the virus by searching through the virtual memory of the virtual computer for a signature from the decrypted viral body.

One problem encountered in implementing GD technology is reducing the number of instructions of a program that must be simulated before a determination of uninfected status can be reliably made. Generally, GD scanners use a set of rules to determine how long to simulate each program. For example, during the initial stage of the emulation, if the program appears to contains a decryption routine, then the GD scanner should simulate the program longer to give the virus a sufficient number of instructions in which to decrypt itself. Conversely, during the initial stage of the emulation, if the program appears strongly to be an uninfected (a "clean") program, then the GD scanner should abort emulation almost immediately.

Unfortunately, some uninfected programs have machine language instructions that look like decryption loops. In addition, some data files also contain binary data which may look like decryption loops, and in some operating systems, such as MS-DOS, data files cannot generally be distinguished from executable files. If the GD scanner detects a possible decryption loop in a program (or in a data file accessed by a program), then it should continue to simulate the program (or data file) until it reliably determines that the program is uninfected. This emulation may take many seconds and may potentially substantially inconvenience the computer user.

Thus, one motivation for the present invention is to develop GD technology that simulates as few instructions of a program (or data file) as possible before being able to reliably determine that it is uninfected. This goal is difficult to attain because the polymorphic decryption routine may take so many different forms and so can be difficult to identify without emulating a large number of instructions.

Another problem in implementing GD technology is avoiding redundant emulation of instructions for a program (or data file) that has been previously determined as uninfected. Frequently, users or programs access the same file over and over again. For example, a user may run the same electronic mail or word processing program many times during a computing session. Furthermore, these programs tend to repeatedly access the same data files. For instance, when the commonly used Lotus cc:mail program for Windows is first launched by the user, it may open and close the configuration file named "CCMAIL.CFG" twenty-eight separate times. If a GD-based real-time antivirus scanner is also being run, the GD scanner will typically repeatedly scan the CCMAIL.CFG file each of the twenty-eight times it is opened. In a typical case, each scan may take only several milliseconds, but it may take several seconds if the file contains data that looks like a decryption loop. This multiple second delay would compound into a very unacceptable several minute delay if the file was rescanned twenty-eight times.

Thus, another motivation for the present invention is to develop GD technology that avoids the redundant emulation of instructions for those programs or data files that were previously determined to be uninfected.

Novell's NetWare software is a commonly used network operating system which identifies each file on the server by a unique identification number. The current version of the Norton Anti-Virus (NAV) software which is used in conjunction with NetWare utilizes a cache to store identification numbers of those files on a server that have previously been determined by scanning to be virus free. If the identification number of a target file is in the cache, the NAV software avoids the redundant rescanning of the file.

However, many operating systems, including Windows 3.1 and Windows 95, do not have unique numbers to identify each file. For such operating systems, filenames, instead of file identification numbers, may be stored in a cache. But filenames may be hundreds of bytes in length in modern operating systems, such as in Windows 95, and indexing by such long filenames is not economical of storage space. Moreover, in order to maintain such a cache, the antivirus software must monitor all requests to modify the files whose filenames are currently in the cache. If a file whose filename is in the cache is modified, the filename must be removed from the cache. Such monitoring complicates and slows down the antivirus software.

DISCLOSURE OF INVENTION

The present invention describes a computer-implemented method for executing a computer file in a CPU emulator (154) to detect a computer virus. The method includes simulating (302) the execution of a predetermined number of instructions of the computer file in the CPU emulator (154), suspending (303) the execution, constructing (304) a state record, temporarily storing (305) the state record in memory, comparing (306) the constructed state record to state records stored in a state cache (158), and indicating (308) that the file is virus free when the constructed state record matches one of the stored state records.

The present invention reduces the number of instructions of a program that must be simulated before a determination of uninfected status can be reliably made because it avoids redundantly emulating instructions. This speeds up the overall operation of a computer which is running real-time, emulator-based antivirus software.

BRIEF DESCRIPTION OF THE DRAWINGS

These and other more detailed and specific objects and features of the present invention are more fully disclosed in the following specification, reference being had to the accompanying drawings, in which:

FIG. 4 is a table showing the first several bytes of an (uninfected) file being scanned.

FIG. 5 is a list showing a state record constructed after the first eight instructions of the file in FIG. 4 are executed.

FIG. 6 is a table showing the first several bytes of the file in FIG. 4 after the file becomes infected with a computer virus.

DETAILED DESCRIPTION OF THE PREFERRED EMBODIMENTS

Figure 1:
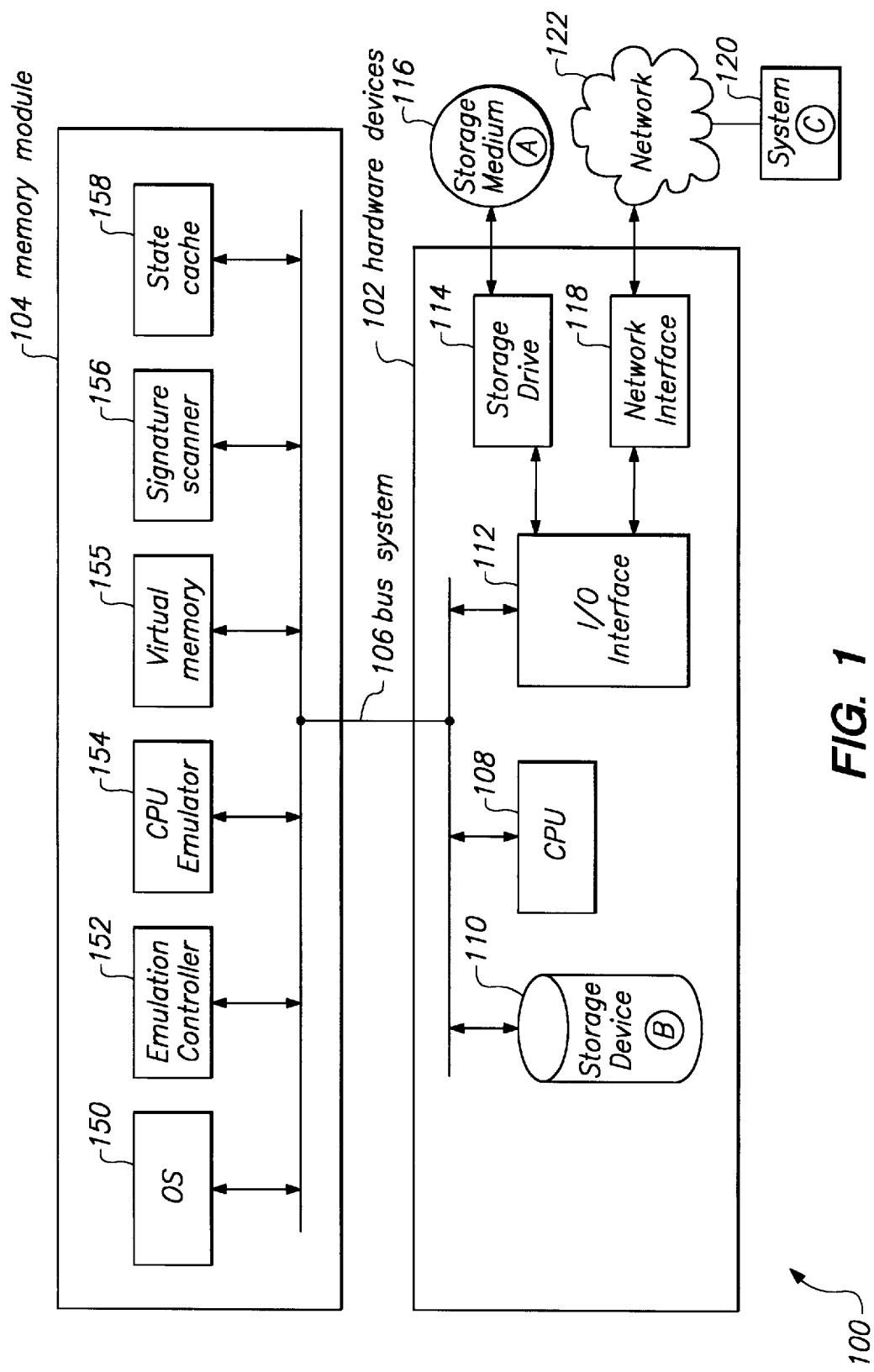
FIG. 1 is a block diagram illustrating a structure of a computer platform which includes a preferred embodiment of the present invention.

FIG. 1 is a block diagram illustrating a structure of a computer platform which includes a preferred embodiment of the present invention. The computer platform 100 includes hardware devices 102 and a memory module 104 for storing programs and data. Communications between the memory module 104 and the hardware devices 102 occurs through the bus system 106.

Preferably, the hardware devices 102 include, but are not limited to: a central processing unit (CPU) 108 (e.g., an Intel "x86" or a Motorola PowerPC processor) communicating with: a storage device 110 (e.g., a hard disk drive) and an input/output (I/O) interface 112 (e.g., a small computer system interface (SCSI) or a Personal Computer Memory Card International Association (PCMCIA) interface). Communicating with the I/O interface 112 are: a storage drive 114 (e.g., a floppy disk drive), which can read programs and data from a storage medium 116 (e.g., a floppy disk), and a network interface 118 (e.g., an ethernet card or a modem), which communicates with a remote system 120 via a network 122 (e.g., a local area network, a wide area network, an intranet, or the global public Internet). A software program (or a data file) suspected of having a computer virus may be stored either on the storage medium 116 (A), the storage device 110 (B), or the remote system 120 (C).

Preferably, the programs and data stored in the memory module 104 include, but are not limited to: an operating system (OS) 150 (e.g., Windows 3.1 , Windows 95 , or Windows NT from Microsoft, OS/2 from IBM, or Macintosh OS from Apple Computer, or a flavor of UNIX), an emulation controller 152, a CPU emulator 154, virtual memory 155, a signature scanner 156, and a state cache 158.

The emulation controller 152 controls the CPU emulator 154. Among other functions, the emulation controller 152 determines when to halt the emulation of a file and begin scanning for viral signatures.

The CPU emulator 154 executes files in a fully contained virtual environment. The virtual environment includes the virtual memory 155 which is effectively independent of the memory of the host computer system. In this way, the CPU emulator 154 is effectively isolated from the actual hardware devices 102 so that no harm can be done by a virus while a file is being simulated.

If the file appears to contain an encrypting virus, the emulation controller 152 will continue the emulation until the virus has decrypted and/or transferred control to itself. After the emulation is finished, the signature scanner 156 searches the virtual memory 155 for known virus signatures.

The state cache 158 is utilized by the emulation controller 152 to determine if the file had previously been determined to be virus free so that the emulation may be terminated early. The state cache 158 may be updated with a least recently used (LRU) policy or some other policy. The operation of the state cache 158 in cooperation with the other components of the system is further described herein with reference to the subsequent figures.

Figure 2:
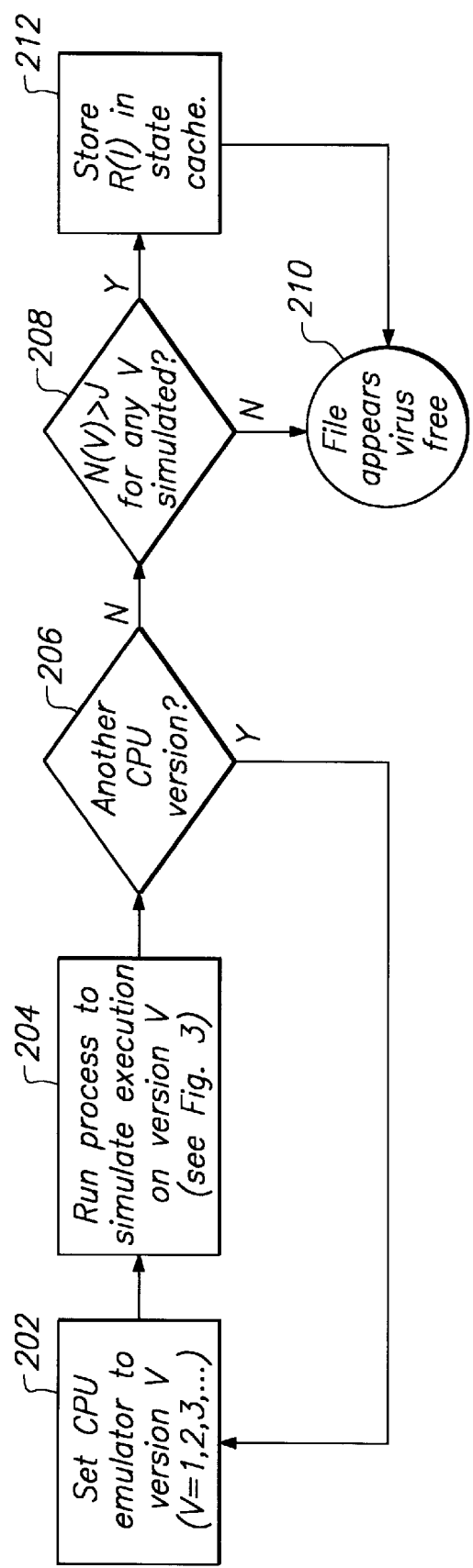
FIG. 2 is a flow diagram of a method to determine whether a file is infected by emulating multiple versions of a CPU according to a preferred embodiment of the present invention.
Figure 3:
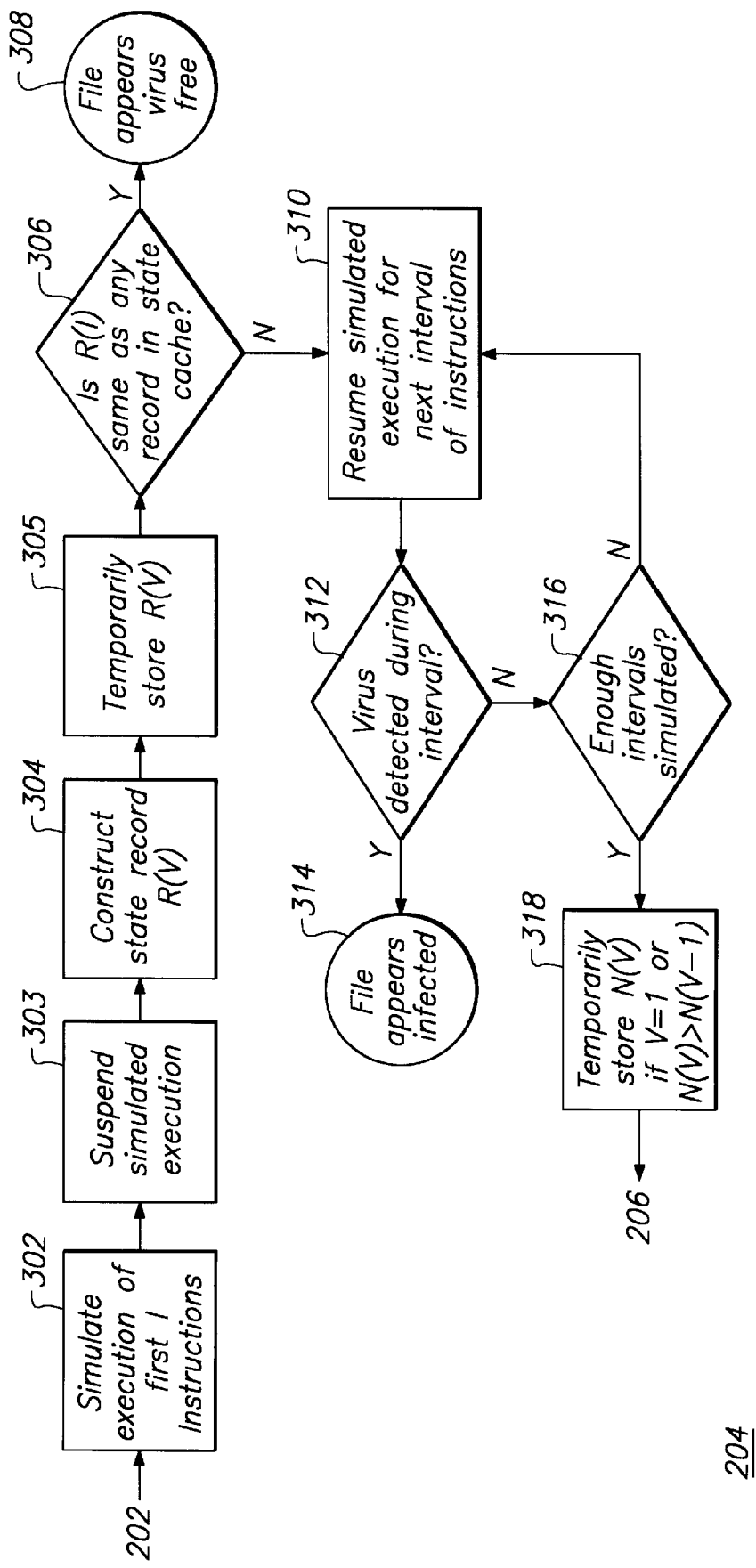
FIG. 3 is a flow diagram of a method to simulate the execution of a file in order to detect a computer virus according to a preferred embodiment of the present invention.

FIGS. 2 and 3 are flow diagrams to illustrate the method of determining whether a file is infected by a computer virus according to a preferred embodiment of the present invention.

Certain software may be run on different versions of a microprocessor, and computer viruses may be engineered to activate on only certain versions of such microprocessors. For example, polymorphic viruses may include instructions in the decryption loop that modify instructions elsewhere in the virus code. This self-modifying character can cause a polymorphic virus to behave differently when infected files are run on processors having different pre-fetch queue sizes or on emulators for these processors. In particular, a polymorphic virus may decrypt on emulators with certain pre-fetch queue sizes, but not on emulators with other pre-fetch queue sizes. Because of the potential impact of pre-fetch queue size on the decryption of polymorphic viruses, a file that includes self-modifying code may have to be emulated repeatedly in order to allow any virus that may be present to decrypt itself properly.

FIG. 2 is a flow diagram of a method to determine whether a file is infected by emulating the file on multiple versions of a CPU. When a file (A, B, or C) is to be checked for viral infection, the emulation controller 152 sets 202 the CPU emulator 154 to emulate version V (V=1, 2, 3, . . . ) of the CPU. For the first version of the CPU which is emulated, let V=1. For example, the CPU emulator 154 may be set 202 to emulate an Intel 80386 processor with a 16 byte pre-fetch queue, or an Intel 80486 processor with a 32 byte pre-fetch queue.

After the CPU emulator 154 is set 202 to version V, the emulation controller 152 causes the CPU emulator 154 to run 204 the process to simulate the execution of the file on CPU version V. This process is further illustrated in FIG. 3 and further described below with respect to FIG. 3.

After running the process shown in FIG. 3, the antivirus software determines 206 whether or not there is another version V of the CPU on which the file execution should be re-simulated. If there is another version V of the CPU on which the file execution should be re-simulated, then the emulation controller 152 goes back and sets 202 the CPU emulator 154 to that other version and runs 204 again the process shown in FIG. 3. On the other hand, if there is no other version V of the CPU on which the execution of the file should be re-simulated, the antivirus software determines 208 whether the total number of instructions of the file that was simulated on version V, N(V), is greater than a predetermined threshold number J.

If N is not greater than J, then the antivirus software is able to return 210 that the file appears to be virus free. On the other hand, if N is greater than J, then the state record R(1) is stored 212 in the state cache 158. (If the state cache 158 is full and uses a LRU updating policy, then the state record for the first CPU version, R(1), replaces the least recently used state record stored in the state cache 158.) After the state record R(1) is stored 212 in the state cache 158, the antivirus software is able to return 210 that the file appears to be virus free.

FIG. 3 is a flow diagram expansion of block number 204 shown in FIG. 2, in which the antivirus software runs the process to simulate the execution of a file on CPU version V.

First, the emulation controller 152 causes the CPU emulator 154 (set to perform as version V of the CPU) to simulate 302 the first I instructions of the file. It should be that I is a predetermined number and I<J. For example, if J=2048, then I could be 1024.

After the first I instructions are simulated 302, the emulation controller 152 suspends 303 the simulation and constructs 304 and temporarily stores 305 a state record, R(V). R(V) typically requires less memory to store than a filename and typically includes the following information about the state of the CPU emulator 154:

1) The virtual instruction pointer. E.g., for a virtual x86 processor, the state record should include CS:IP. The CS (code segment) register points to the start address of the code segment in memory while the IP (instruction pointer) register points to the exact location within the code segment from where the next instruction should be read.
2) Several of the instruction bytes before and/or after the one pointed to by the virtual instruction pointer. E.g., for an x86 processor, the state record may include the bytes at CS:IP−8, CS:IP−7, . . . , CS:IP−2, CS:IP−1, CS:IP, CS:IP+1, CS:IP+2, . . . , CS:IP+6, , and CS:IP+7.
3) The values of virtual general registers of the CPU emulator 154. E.g., for an x86 processor, the state record may include the values of EAX, EBX, ECX, EDX, EBP, ESI, EDI, and ESP.
4) Several of the bytes before and/or after the one pointed to by the stack pointer. E.g., for an x86 processor, the state record may include the bytes at SS:SP−8, SS:SP−7, . . . , SS:SP−2, SS:SP−1, SS:SP, SS:SP+1, SS:SP+2, . . . , SS:SP+6, and SS:SP+7. The SS (stack segment) register points to the start address of the area in memory used as the stack while the SP (stack pointer) register points to the exact location in the stack segment where the last item was stored.

In addition to the above characteristics of the state of the CPU emulator 154, R(V) may also include identifying characteristics that are not part of the CPU state, but are nevertheless useful to include as part of R(V). Such characteristics include the following:

5) The size of the file being simulated.
6) The number of writes to virtual memory 155 performed during the emulation of the first I instructions.
7) The cyclic redundancy check (CRC) values of the data written to virtual memory 155 during the emulation of the first I instructions. CRC values are used to efficiently detect data errors, and their use is well known in the pertinent art.

After the state record R(V) is temporarily stored 305, the emulation controller 152 compares 306 the state record R(V) with state records stored in the state cache 158. If R(V) is identical to any record in the state cache 158, then the antivirus software is able to return 308 the result that no virus was detected because a state cache hit occurred. If R(V) does not match any record in the state cache 158, then the emulation controller 152 causes the CPU emulator 154 to resume normal simulation 310 for the next interval of instructions starting at the next unsimulated instruction.

After the interval of instructions are simulated 310, the emulation controller 152 uses the signature scanner 156 to detect 312 the presence of any of a set of known viruses. If the signature scanner 156 detects the presence of a virus, then the antivirus software is able to return 314 the result indicating that a virus was detected and the identity of the virus detected. If the signature scanner 156 does not detect the presence of a virus, then the emulation controller 152 determines 316 whether enough intervals have been simulated in order to make the determination to a high level of certainty that the file is virus free.

If not enough intervals have been simulated, then the emulation controller 152 causes the CPU emulator 154 to resume normal simulation 310 for the next interval of instructions starting at the next unsimulated instruction. On the other hand, if enough intervals have been simulated, then N(V) is temporarily stored 318 in memory and, since no virus has yet been detected, the process proceeds to block number 206 shown in FIG. 2.

FIGS. 4, 5, and 6 illustrate the operation of the present invention with an example. In this example, the CPU is a single version of an x86 processor and the state record includes: the instruction pointer (CS:IP); the instruction bytes at CS:IP, CS:IP−1, CS:IP−2, . . . , CS:IP−6, CS:IP−7; the contents of the general registers EAX, EBX, ECX, EDX, ESP, EBP, ESI, EDI; the file size; and the number of memory writes that occurred during the execution of the first I instructions. Furthermore, in this example, I=8 and J=100.

The first several bytes of the (uninfected) file being scanned in this example is shown in FIG. 4. After the antivirus software simulates 302 the first I=8 instructions, a state record is constructed 304 which is shown in FIG. 5.

If the (uninfected) file is being scanned for the first time, the antivirus software will simulate 310 the next interval of instructions until the file is determined 316 likely to be virus free. For this example, assume that the file is determined 316 likely to be virus free after N=5000 instructions were simulated.

Since N=5000 is greater than J=100, the state record shown in FIG. 6 will be stored 218 in the state cache and the antivirus software will indicate 208 that the file appears to be virus free.

FIG. 6 shows the first several bytes of the file after it becomes infected with a virus. FIG. 6 also shows the beginning and end of the virus body. When the infected file is scanned, the state record constructed 304 after I=8 instructions are simulated 302 will almost certainly be radically different from the state record constructed 304 after I=8 instructions were simulated for the uninfected file.

The above description is included to illustrate the operation of the preferred embodiments and is not meant to limit the scope of the invention. The scope of the invention is to be limited only by the following claims. From the above discussion, many variations will be apparent to one skilled in the art that would yet be encompassed by the spirit and scope of the invention.

What is claimed is:

1. A computer-implemented method for detecting computer viruses in a computer file, the method comprising:
   simulating execution of the computer file by a CPU emulator in a computer memory for a first predetermined number of instructions;
   suspending the simulated execution;
   constructing a current state record of the CPU emulator;
   comparing the current state record to state records previously stored in a state-based cache;
   indicating that no virus is detected when the current state record matches one of the previously stored state records;
   wherein each state record includes a total number of data writes to a virtual memory performed during the simulated execution of the computer file by the CPU emulator; and
   wherein each state record includes a cyclic redundancy check value calculated from the data writes to the virtual memory.

2. A computer program product comprising a computer-usable medium having computer-readable code embodied therein for detecting computer viruses in a computer file, comprising:
   computer-readable program code devices configured to simulate execution of the computer file on a CPU emulator for a first predetermined number of instructions wherein the first predetermined number of instructions is less than 20;
   computer-readable program code devices configured to suspend the simulated execution;
   computer-readable program code devices configured to construct a current state record of the CPU emulator;
   computer-readable program code devices configured to compare the current state record to state records previously stored in a state-based cache; and
   computer-readable program code devices configured to indicate that no virus is detected when the current state record matches one of the previously stored state records.

3. A computer-implemented method for detecting computer viruses in a computer file, the method comprising:
   simulating execution of the computer file by a CPU emulator in a computer memory for a first predetermined number of instructions, wherein the first predetermined number of instructions is less than 20
   suspending the simulated execution;
   constructing a current state record of the CPU emulator;
   comparing the current state record to state records previously stored in a state-based cache; and
   indicating that no virus is detected when the current state record matches one of the previously stored state records.

4. A computer-implemented method for detecting computer viruses in a computer file, the method comprising:
   simulating execution of the computer file by a CPU emulator in a computer memory for a first predetermined number of instructions;
   suspending the simulated execution;
   constructing a current state record of the CPU emulator;
   comparing the current state record to state records previously stored in a state-based cache;
   indicating that no virus is detected when the current state record matches one of the previously stored state records;
   wherein each state record includes a value of a virtual instruction pointer within the CPU emulator; and
   wherein each state record includes a byte from a virtual memory address nearby an address corresponding to the value of the virtual instruction pointer.

5. A computer-implemented method for detecting computer viruses in a computer file, the method comprising:
   simulating execution of the computer file by a CPU emulator in a computer memory for a first predetermined number of instructions;
   suspending the simulated execution;
   constructing a current state record of the CPU emulator;
   comparing the current state record to state records previously stored in a state-based cache;
   indicating that no virus is detected when the current state record matches one of the previously stored state records; and
   wherein each state record includes a byte from a virtual memory address nearby an address corresponding to a value of a virtual stack pointer.

* * * * *